Patented Jan. 6, 1931

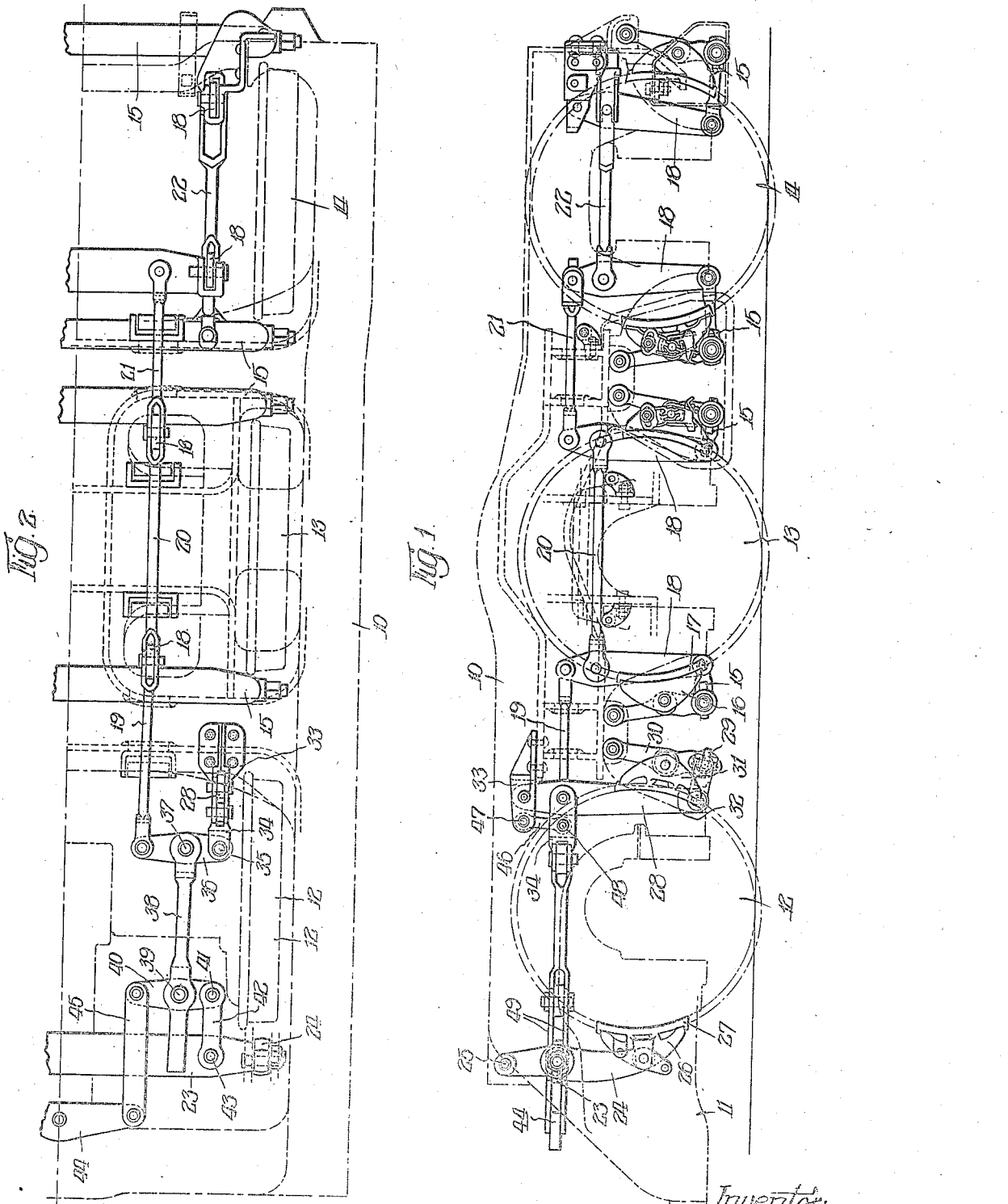

1,787,563

UNITED STATES PATENT OFFICE

WALTER H. BASELT, OF CHICAGO, ILLINOIS, ASSIGNOR TO AMERICAN STEEL FOUNDRIES, OF CHICAGO, ILLINOIS, A CORPORATION OF NEW JERSEY

BRAKE MECHANISM

Application filed September 26, 1928. Serial No. 308,365.

This invention relates to brake mechanism, and more particularly to clasp brake mechanism used on tender trucks having auxiliary locomotives.

Heretofore it has been found that clearance conditions on locomotive tender trucks having auxiliary locomotives presented problems which appeared to make it impossible to provide the end tender wheels adjacent the auxiliary locomotives with brakes. It is desirable of course to have all of the wheels of the locomotive tender provided with brakes for improving the efficiency in stopping a train.

One object of the invention is to provide a brake mechanism arrangement for tender trucks having auxiliary locomotives in which, in spite of close clearance conditions, the brakes may be applied to all of the wheels of the tender truck including those adjacent the auxiliary locomotive.

Another object is to provide clasp brake mechanism as above indicated in which the tension connection between the brakes may be properly supported against sag.

Another object is to provide clasp brake mechanism in which the parts are arranged to cooperate in an improved manner.

These and other objects are accomplished by means of the arrangement disclosed on the accompanying sheet of drawings, in which—

Figure 1 is a fragmentary side elevation of a locomotive tender truck embodying my invention; and Figure 2 is a fragmentary plan view of the same.

The various novel features of the invention will be apparent from the following description and drawings and will be particularly pointed out in the appended claims.

Referring to the figures of the drawing, it will be noted that the invention is illustrated in connection with a locomotive tender truck having a frame 10, the forward portion of which is arranged to support an auxiliary locomotive 11 which, as is well known, is for assisting in starting up heavy trains, said auxiliary locomotive being kept in gear until the train assumes a predetermined speed; for example, fifteen miles an hour, whereupon the auxiliary locomotive automatically is thrown out of gear. The truck wheels 12, 13 and 14 support the tender frame 10 and the brake mechanism therefor.

The brake mechanism is of the clasp brake type in which brake shoes engage opposite sides of each wheel. The mechanism is the same on each side of the trucks, and accordingly, only one side will be referred to specifically. Brake beams 15 carrying brake heads 16 and brake shoes 17 are mounted upon each side of the wheel 13 and 14, and said brake beams are connected to associated brake levers 18 which in turn are connected by a series of tension rods 19, 20, 21 and 22 in a manner usual in clasp brakes for locomotive tenders.

This invention relates particularly to the clasp brake arrangement and supporting means therefor located at the end of the tender adjacent the auxiliary locomotive 11. At one side of the pair of wheels 12 is a brake beam 23 located considerably above the center of the wheels 12 and connected to each end of the beam 23 is a brake lever 24 which is pivotally supported at 25 by the frame 10. Secured to the lower end of each of the brake levers 24 is a brake head 26 carrying a brake shoe 27 adapted to engage the wheel 12 at one side thereof. Located at the opposite side of the wheel is another brake lever 28 operatively connected to a brake beam 29 located considerably below the center of the wheel 12. This brake beam 29 is supported by hanger 30 to which is pivotally secured a brake head 31 carrying a brake shoe 32 adapted to engage the wheel 12 at a point opposite the point where brake shoe 27 engages said wheel. The brake lever 28 at each side of the truck is pivotally supported at its upper end in a bracket 33 secured to the frame 10. One end of a tension member 34 is connected to the brake lever 28 near the upper end of the latter. The opposite end of the tension member 34 is pivotally connected at 35 to one end of a floating lever 36. Pivotally secured to the opposite end of the floating lever 36 is the tension rod 19. Intermediate the ends of the floating lever 36, there is pivotally connected at 37 a main tension rod 38 which also is pivotally connected at 39 to an intermediate portion of another floating lever 40. Pivotally connected to the floating lever 40 at 41 is another tension member 42, the opposite end of which is pivotally connected at 43 to the brake beam 23. The opposite end of the floating lever 40 is operatively connected to an equalizer bar 44 through a link 45.

Were nothing else provided in way of supporting the clasp brake mechanism at this end of the tender truck, such brake mechanism would sag. To overcome this difficulty, auxiliary means has been provided to support said mechanism against sag. This auxiliary means includes a link 46 mounted adjacent the brake lever 28 and having its upper end pivotally connected at 47 to the bracket 33 and having its lower end pivotally connected at 48 to the tension member 34, thereby providing a parallel link supporting arrangement between the bracket 33 and the tension member 34 for holding the latter, the floating lever 36, tension rod 38 and floating lever 40 against sag. Supplementing the link 46 to prevent sag of the brake mechanism, one end of the main tension rod 38 is extended in the form of a fork shaped portion, as shown at 49, for slidably embracing the upper and lower surfaces of the brake beam 23, thereby assisting in the supporting of the floating levers 40 and 36 and the tension rod 38 against sag. As shown, these parts are located inwardly with respect to the truck wheels and between the latter and the auxiliary locomotive, supporting portions wherein the clearance spaces are limited.

By means of the clasp brake arrangement herein disclosed, the objects of this invention are accomplished.

It is my intention to cover all modifications of the invention falling within the spirit and scope of the following claims.

I claim:

1. In clasp brake mechanism, the combination of brake levers on opposite sides of a wheel, an operative tension connection between said brake levers including a floating lever and a plurality of tension members connected to said floating lever and extending in opposite directions therefrom, and a supported hanger connected to one of said tension members for supporting said tension connection against sag.

2. In clasp brake mechanism, the combination of brake levers on opposite sides of a wheel, an operative tension connection between said brake levers including a floating lever and a plurality of tension members connected to said floating lever and extending in opposite directions therefrom, and a supported hanger connected to one of said tension members for supporting said tension connection against sag, another of said tension members having an extension whereby it is additionally supported against sag.

3. In clasp brake mechanism, the combination of brake levers on opposite sides of a wheel, an operative tension connection between said brake levers including two floating levers, a tension member connecting said floating members and a second tension member connected to one of said floating levers, and a supported hanger connected to one of said tension members for supporting said tension connection against sag.

4. In clasp brake mechanism, the combination of brake levers on opposite sides of a wheel, an operative tension connection between said brake levers including two floating levers, a tension member connecting said floating members and a second tension member connected to one of said floating levers, and a supported hanger connected to one of said tension members for supporting said tension connection against sag, the tension member connecting said floating levers having an extension whereby it is additionally supported against sag.

5. In brake mechanism, the combination of supported brake levers on opposite sides of a wheel, a brake beam supported by one of said levers, a tension connection between said brake beam and the second of said brake levers including a main tension rod, two floating levers connected thereto, a tension member connecting said brake beam and one of said floating members, a second tension member connecting said other floating lever and said second brake lever, and a supported hanger adjacent said second brake lever connected to said second tension member for supporting said tension connection against sag.

6. In brake mechanism, the combination of supported brake levers on opposite sides of a wheel, a brake beam supported by one of said levers, a tension connection between said brake beam and the second of said brake levers including a main tension rod, two floating levers connected thereto, a tension member connecting said brake beam and one of said floating members, a second tension member connecting said other floating lever and said second brake lever, and a supported hanger adjacent said second brake lever connected to said second tension member for supporting said tension connection against sag, said main tension rod having an extension resting on said brake beam for assisting in supporting said tension connection against sag.

7. In clasp brake mechanism, the combination of brake levers on opposite sides of a wheel, an operative connection between said brake levers including a floating lever and a plurality of brake rods connected to said floating lever and extending in opposite directions therefrom, and a supported hanger connected to one of said rods for supporting said operative connection against sag.

Signed at Chicago, Illinois, this 21st day of September, 1928.

WALTER H. BASELT.